Dec. 9, 1947.  C. M. LEE  2,432,479
FOCUSING LENS MOUNT
Filed Jan. 22, 1946

CHARLES M. LEE
*INVENTOR*

BY
*ATTORNEYS*

Patented Dec. 9, 1947

2,432,479

UNITED STATES PATENT OFFICE 2,432,479

FOCUSING LENS MOUNT

Charles M. Lee, Rochester, N. Y., assignor to Eastman Kodak Company, Rochester, N. Y., a corporation of New Jersey Application January 22, 1946, Serial No. 642,649

3 Claims. (Cl. 95—45)

This invention relates to photography and more particularly to focusing lens mounts. One object of my invention is to provide an inexpensive mount for an objective of the type in which one lens element is moved relative to the remaining lens elements for focusing the camera. Another object of my invention is to provide an extremely simple and inexpensive lens mount which is well adapted for use on cameras which must be sold at a low figure. Another object of my invention is to provide a lens mount of the type described which will present a neat appearance and which can readily be assembled. Other objects will appear from the following specification, the novelty features being particularly pointed out in the claims at the end thereof.

It is well known that there are a number of types of objectives which can be focused by moving the front lens element relative to the remaining lens elements and such objects are usually used on cameras in which the mechanism or camera structure does not permit the entire photographic objective to be moved for focusing. In such focusing objectives, the most expensive part of the mount is the screw threads which must be formed with extreme accuracy in order to hold the various lens elements accurately on the same optical axis. In order to materially reduce the cost of a focusing lens mount, the number of threads should be reduced to a minimum and the parts of the lens mount supporting the lens of the objective should be made as simple as possible.

In my Patent 2,271,227, for lens mount, granted January 27, 1942, I have provided a more or less normal type of focusing lens mount and it will be noticed that in this patent there are six different cylindrical members which require threads. Such a mount is too expensive for use on simple cameras, such as box cameras, and my present lens mount is a material simplification of the lens mount shown in my patent and also a simplification of the lens mount shown in Patent 2,245,241 to Wood, Lens mount and method of assembling same, granted January 10, 1941. In this patent the number of threads has been considerably reduced, in one case five and in the other case six threaded members being employed. However, with my present lens mount I have succeeded in eliminating all but a pair of threaded members and I have also simplified the parts to a considerable extent.

Coming now to the drawings wherein like reference characters denote like parts throughout:

Figure 1:
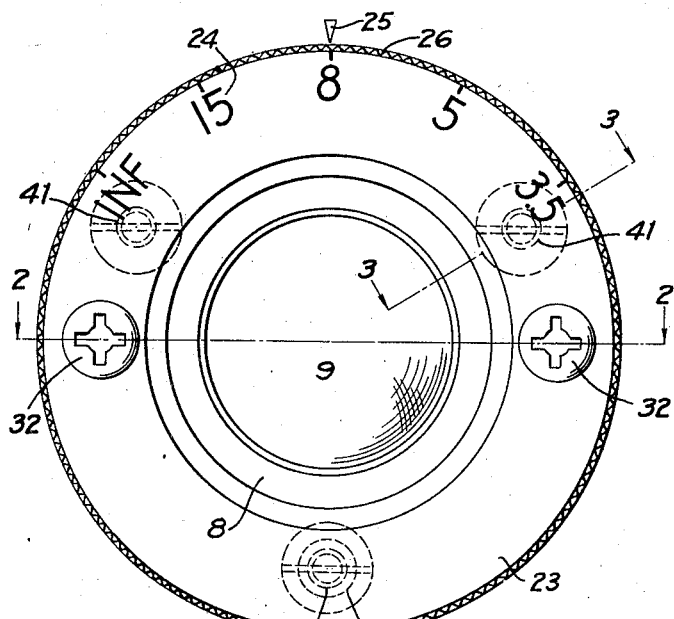
Fig. 1 is a front plan view of a focusing lens mount constructed in accordance with and embodying a preferred form of my invention.

My invention consists broadly in providing a lens mount for focusing objectives in which the cost of the mount is reduced to a minimum by a simplification of the parts used for holding the various objectives and particularly by reducing the number of threads which must be accurately formed to produce the desired results.

More specifically, I provide a mount for focusing objectives which includes an annular lens mount 1 which includes a flat base plate 2 having a central aperture 3. A pair of coaxial cylindrical flanges 4 and 5 extend outwardly from the base plate 2, flange 5 preferably being somewhat longer than flange 4. Flange 4 carries a threaded area 6 with which the thread 7 of a lens cell 8 may mesh. By turning the lens cell 8 a movable lens mount element 9 carried by the lens cell 8 may be moved to and from the remaining lenses 10 and 11 which in this case form the complete objective.

Figure 2:
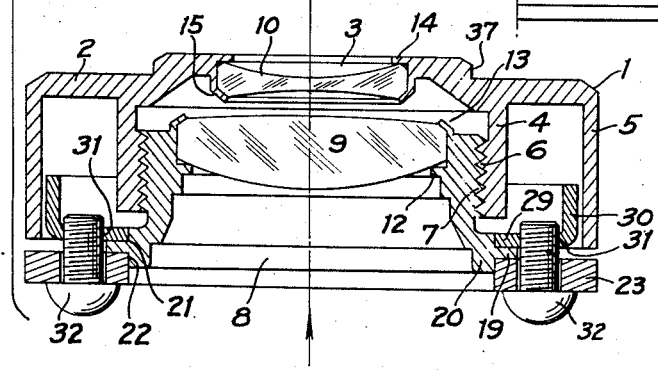
Fig. 2 is a section through the lens mount taken on line 2—2 of Fig. 1.

The lens 9 is "spun" into the lens mount 8 by placing the lens element 9 against a flange 12 and spinning over the flange 13 against the lens 9 in a known manner. Similarly the lens 10 is placed against a flange 14 and a second flange 15 is spun over against the lens 10 to hold this lens in the opening 3 of the base plate 2. In the present embodiment of my invention the rear lens element 11 may be placed against a flange 16 carried by a partition plate 17 and a second flange 18 may be spun over the edge of lens 11 to hold this lens in place. The partition plate 17 forms a part of a camera wall and is not shown in full, being indicated in Fig. 2.

The threaded lens cell 8 is provided with an outwardly extending flange 19. This flange preferably lying in the center of a rib 20 to form a pair of spaced shoulders 21 and 22 against which additional parts may be located.

A focusing ring 23 may fit against the outwardly extending flange 19 on the outside. This ring may carry graduations 24 forming a focusing scale. A pointer 25, indicating the particular focal setting is indicated in Fig. 1. I prefer to knurl or otherwise roughen the periphery 26 of the focusing ring 23 to facilitate the turning of the movable lens mount 8.

In order to hold the focusing ring 23 in the correct position clamped upon the lens cell 8, I provided an annular member 29 having a rearwardly extending and cylindrical flange 30 which closely approaches but preferably does not actually touch the cylindrical flange 5 carried by the lens mount. This annular member is threaded at 31 to receive screws 32 so that the outwardly extending flange 19 may extend between the focusing ring 23 and annular member 29 and, when the screws 32 are fastened, may be held together thereby.

Figure 3:
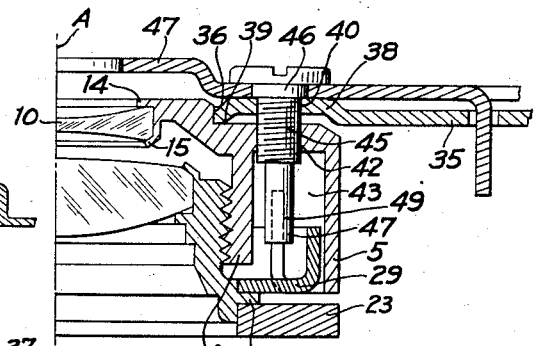
Fig. 3 is a fragmentary section view taken on line 3—3 of Fig. 1.

In initially setting up the focusing lens, the rear lens element 11 is assembled to a camera partition plate 17 and the lens mount 1 is assembled to a lens board or camera wall 35. This lens board is shown in Fig. 3 as being provided with a central opening 36 of a size to receive a flange 37 on the base plate 2 to guide the lens mount 1 in place. The lens board 35 is preferably provided with three raised protuberances 38, the lower face 39 of which can be accurately finished to lie in a plane exactly at right angles to the lens axis A. The lens board 35 is provided with openings 40 in the protuberances 38 through which screws 41 may be passed from the rear of the lens board 35. These screws having a threaded engagement at 42 and extending at least partially into a space 43 lying between the cylindrical flanges 4 and 5. As indicated in Fig. 1, I prefer to provide two similar screws 41 which will directly engage the outer surfaces of the protuberances 38. One screw 45 is preferably a shoulder screw, as shown in Fig. 3 the shoulder 46 forming a support on which a diaphragm plate 47 may turn, as well as constituting one means for holding the shutter mount on the lens board. The screw 45 is likewise provided with an extension 47 extending most of the way between the walls 4 and 5 in the annular space 43.

The reason for this is that the end 47 of the screw 45 forms a stop for a lug 49 carried by the annular plate 29, this lug extending rearwardly through the space 43. Thus, when the movable lens mount 8 is turned, the lug 49 may strike the extension 47 on the pin 46 so as to limit the rotational movement of the focusing ring 23 and the corresponding rotational movement of the lens mount 8 on its threaded connection 7—6 with the lens mount 1.

The parts which I have described above are all simple parts which can be readily made from sheet metal or from screw machine parts. They can be made inexpensively and yet they can readily be made with sufficient accuracy to hold the parts of the objective in their proper relationship. The mount includes only two accurately formed threads, the threads 6 and 7 on which the focusing lens mount 8 may turn. In the remaining threaded openings the threads can be made by ordinary tapping methods and ordinary screws are entirely satisfactory, since the function of these threaded apertures and screws is merely to hold the parts in the proper relationship and not to provide a movable connection on which one part holds a lens element accurately on an objective axis. Such threads need to be particularly accurately formed where one element is to be moved axially of a second element.

In assembling the objective, the lens 11 is mounted in the camera wall 17 and the lens mount 1 is attached by the screws 41 and 45 to the lens board 35. With the screws 32 loosened, the objective is focused at a definite focal setting, as for instance 8 feet as shown in Fig. 1 and the annular member 29 is tightened to the focusing ring 23 after the numeral 8 has been brought opposite the pointer 25, as shown in Fig. 1, care being taken to have the lug 49 in such a position that movement of the focusing ring 23 is permitted between the "Inf" position and the focal setting of 3.5. As soon as the screws 32 are tightened, the camera is in focus and ready for use, since the other graduations on the scale have been selected for the focal length of the objective which is being mounted on the camera. It will thus be seen that I have provided an extremely simple and inexpensive focusing lens mount which may be used on box cameras or other inexpensive cameras and which can be simply and easily assembled.

I claim:

1. A mount for focusing objectives comprising, in combination, an annular lens mount, a lens rigidly mounted therein, a thread on said mount, two spaced coaxial cylindrical flanges carried by the mount, one inside of the other, the inner flange carrying said thread, a threaded lens cell movably mounted on the thread on the lens mount, an outwardly extending flange on the lens cell, a focusing ring carrying a focusing scale fitting the outwardly extending flange on the lens cell, an annular member including a cylindrical flange, the inside of the annular member fitting the outwardly extending flange on the lens cell and the cylindrical flange of the annular member closely approaching but being spaced from the outer cylindrical flange on the lens mount in telescoping relation thereto, releasable means including screws for holding said focusing ring and the annular flange together and against the outwardly extending flange of the lens cell, said releasable means including screws constituting, with a roughened periphery on the focusing ring, a means for moving the focusing ring relatively to the lens supporting cell for adjusting the focusing scale in assembly, said focusing ring and the annular member protecting the threaded members.

2. A mount for focusing objectives comprising, in combination, an annular lens mount, a lens rigidly mounted therein, a thread on said mount, two spaced coaxial cylindrical flanges carried by the mount, one inside of the other, the inner flange carrying said thread, a threaded lens cell movably mounted on the thread on the lens mount, an outwardly extending flange on the lens cell, a focusing ring carrying a focusing scale fitting the outwardly extending flange on the lens cell, an annular member including a cylindrical flange, the inside of the annular member fitting the outwardly extending flange on the lens cell and the cylindrical flange of the annular member closely approaching but being spaced from the outer cylindrical flange on the lens mount in telescoping relation thereto, and means for holding the lens mount on a camera including a lens board, comprising screws extending through the lens board and into the lens mount between the two spaced annular walls carried by the mount.

3. A mount for focusing objectives comprising, in combination, an annular lens mount, a lens rigidly mounted therein, a thread on said mount, two spaced coaxial cylindrical flanges carried by the mount, one inside of the other, the inner flange carrying said thread, a threaded lens cell movably mounted on the thread on the lens mount, an outwardly extending flange on the lens cell, a focusing ring carrying a focusing scale fitting the outwardly extending flange on the lens cell, an annular member including a cylindrical flange, the inside of the annular member fitting the outwardly extending flange on the lens cell and the cylindrical flange of the annular member closely approaching but being spaced from the outer cylindrical flange on the lens mount in telescoping relation thereto, and means for holding the lens mount on a camera including a lens board, comprising screws extending through the lens board and into the lens mount between the two spaced annular walls carried by the mount, a lug extending from the annular member down between the two annular flanges of the lens mount, at least one of said lens mount fastening screws extending up between said annular flanges on the lens mount to engage and limit the movement of said lug.

CHARLES M. LEE.

REFERENCES CITED

The following references are of record in the file of this patent:

UNITED STATES PATENTS

| Number | Name | Date |
|---|---|---|
| 2,234,707 | Ort | Mar. 11, 1941 |
| 2,017,823 | Taylor | Oct. 15, 1935 |
| 2,245,241 | Wood | Jan. 10, 1941 |